United States Patent
To et al.

(10) Patent No.: US 7,736,460 B2
(45) Date of Patent: Jun. 15, 2010

(54) METHOD AND SYSTEM FOR FILM REMOVAL AND SORTING OF COATED RESIN PRODUCTS

(75) Inventors: Kazuhisa To, Fuchu-cho (JP); Kenji Moriwaki, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 792 days.

(21) Appl. No.: 11/704,302

(22) Filed: Feb. 9, 2007

(65) Prior Publication Data

US 2007/0187035 A1    Aug. 16, 2007

(30) Foreign Application Priority Data

Feb. 10, 2006  (JP) .............................. 2006-034283
Nov. 28, 2006  (JP) .............................. 2006-320743

(51) Int. Cl.
  *B29B 17/00*   (2006.01)
(52) U.S. Cl. ........................................ 156/344; 156/584
(58) Field of Classification Search ................ 156/344, 156/584; 264/37.3, 37.31, 37.32, 37.33
  See application file for complete search history.

(56) References Cited

U.S. PATENT DOCUMENTS 5,590,789 A * 1/1997 Stricker et al. ................ 209/11

FOREIGN PATENT DOCUMENTS

| DE | 43 01 988 | 7/1994 |
| DE | 103 48 144 | 5/2005 |
| EP | 1 449 630 | 8/2004 |
| JP | 07156149 A * | 6/1995 |
| JP | 2001-353721 | 12/2001 |

OTHER PUBLICATIONS

Eckhard Zeiger, "Sortierung von PET-Flakes mit Mogensen MikroSort AF0916/ Sorting PET Flakes with the Mogensen MikroSort AF0916", AT-Aufbereitungs Technik—Mineral Processing, vol. 44, No. 11/12, Nov. 2003, pp. 41-45.

(Continued)

*Primary Examiner*—Khanh Nguyen
*Assistant Examiner*—Margaret Squalls

(57) ABSTRACT

Disclosed is a film-removal/sorting method for coated resin products, which comprises a film removal step (S5) of feeding a target material comprising a mixture of plural types of coated resin products each having a different softening temperature in at least either one of a film (2b) and a substrate (2a) thereof, into a film removing apparatus (20), and heating the target material in the film removing apparatus (20) up to a temperature allowing the substrate (2a) or the film (2b) of at least either one of the coated resin products to be softened in a non-molten state, so as to remove the film (2b) from the substrate (2a), and a sorting step (S9) of sorting the target material after being subjected to the film removal step (S5), between a film-free material (2A) consisting of the substrate (2a) of the coated resin product which has succeeded in removing the film (2b) therefrom, and an untreated target material (2B) consisting of the remaining coated resin products having residual films (2b). The film removal step (S5) and the sorting step (S9) are repeatedly carried out while increasing the temperature of the target material in the film removal step (S5) stepwise within a temperature range equal to or less than a highest one of softening temperatures of the films (2b) and the substrates (2a) of the coated resin products.

16 Claims, 10 Drawing Sheets

OTHER PUBLICATIONS

Carl Hanser Verlag, "Kunststoffe in Verpackungsabfällen identifizieren", Kunststoffe, Munich, Germany, Apr. 1, 1992, pp. 293-294.

Extended European Search Report, mailed Jun. 4, 2007 and issued in corresponding European Patent Application No. 0710937.6-2307.

* cited by examiner

METHOD AND SYSTEM FOR FILM REMOVAL AND SORTING OF COATED RESIN PRODUCTS

BACKGROUND OF THE INVENTION

1. Field of the Invention

The present invention relates to a technique of heating a target material, such as shredded resin components of used automobiles, up to a softening temperature to remove a film from a substrate thereof, and recyclably sorting the substrate which has succeeded in removing the film therefrom.

2. Description of the Related Art

Heretofore, great efforts have been made for recycling resin components of used automobiles, such as resin bumpers. In the recycling process, if the resin component is coated with a film, the film is likely to be not fully removed and left on a substrate. Consequently, a component made of a recycled material from such coated resin products has a problem about mechanical properties, such as occurrence of cracks in a portion having a residual film due to external force applied thereto, and/or a problem about deterioration in appearance.

Thus, there is the need for forming a recycled product using only a resin free of a residual film.

As one example of a technique of recycling such a coated resin product, Japanese Patent Laid-Open Publication No. 2001-353721 discloses a technique of shredding coated resin components into fragments, pre-heating the fragments up to a temperature just before a melting temperature thereof, agitating the pre-heated fragments in a treatment vessel, and rapidly increasing the temperature of the fragments under agitation at the start of the agitation to reduce a process time.

Generally, in a coated resin product, a film (typically, thermosetting resin) and a substrate (typically, thermoplastic resin) are different in melting point from each other, and plural types of resins different in melting point, as typified by ABS (acrylonitrile butadiene styrene) and PC (polycarbonate), are used for a resin molding process. Moreover, temperature characteristics of a resin material are varied depending on the types (talc, glass, calcium carbonate, etc.) and contents of additives to be contained in the resin material. For example, as shown in FIGS. 10A to 10D, a heat deflection temperature of a resin material, i.e., a temperature at which a resin material exhibits a certain deformation (the resin material is softened in a non-molten state) during heating at a constant speed under a constant load, is changed to some extent depending on the types and contents of additives or resin matrix compositions. Thus, in a recycling process for a mixture of plural types of resin products, if the mixture is simple heated up to a single softening temperature, a part of the resin products which have not being softened to have residual films will be undesirably mixed with the resin products which have succeeded in being soften to allow films to be removed therefrom.

SUMMARY OF THE INVENTION

In view of the above problem, it is an object of the present invention to provide a technique capable of increasing a film removal rate even in a film removal treatment for a mixture of plural types of coated resin products so as to achieve a higher recycling rate.

In order to achieve this object, according to one aspect of the present invention, there is provided a method for film removal and sorting of coated resin products, which comprises: a film removal step of feeding a target material comprising a mixture of plural types of coated resin products each having a different softening temperature in at least either one of a film and a substrate thereof, into a film removing apparatus, and heating the target material in the film removing apparatus up to a temperature allowing the substrate or the film of at least either one of the coated resin products to be softened in a non-molten state, so as to remove the film from the substrate, and a sorting step of sorting the target material after being subjected to the film removal step, between a film-free material consisting of the substrate of the coated resin product which has succeeded in removing the film therefrom, and an untreated target material consisting of the remaining coated resin products having residual films. In this method, the film removal step and the sorting step are repeatedly carried out while increasing the temperature of the target material in the film removal step stepwise within a temperature range equal to or less than a highest one of softening temperatures of the films and the substrates of the coated resin products, in such a manner that: the target material is heated in the film removal step up to a first softening temperature which is a lowest one of softening temperatures of the films and the substrates of the coated resin products, and then sorted in the sorting step between a film-free material and an untreated target material having residual films; and the untreated target material is heated in the film removal step up to a softening temperature which is a lowest one of softening temperatures of the films and the substrates of the remaining coated resin products and greater than the first softening temperature, and then sorted in the sorting step between a film-free material and an untreated target material having residual films.

As used in this specification, the term "softening temperature" means a temperature at which a coated resin product is softened in a non-molten state to an extent allowing a film is removed from a substrate thereof. For example, the aforementioned heat deflection temperature and a given temperature range around the heat deflection temperature are included in the softening temperature.

DETAILED DESCRIPTION OF THE PREFERRED EMBODIMENTS

With reference to the accompanying drawings, an embodiment of the present invention will now be specifically described.

The following embodiment is one example of means for implementing the present invention, and various changes and modifications may be made therein without departing from the spirit and scope of the invention.

[General System Configuration]

Figure 1:
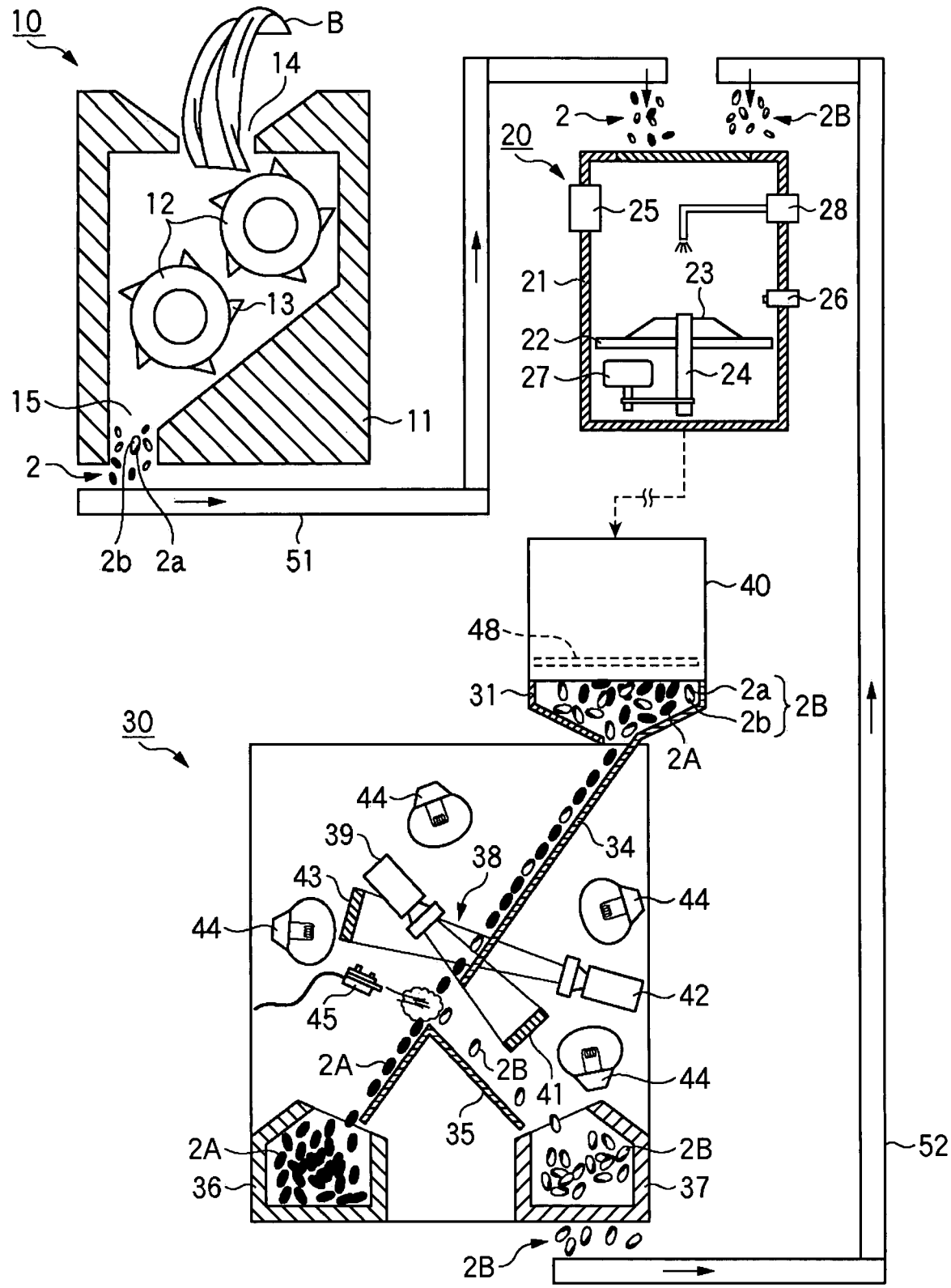
FIG. 1 is a schematic diagram showing a general configuration of a film-removal/sorting system for coated resin products, according to one embodiment of the present invention.

FIG. 1 is a schematic diagram showing a general configuration of a film-removal/sorting system for coated resin products, according to one embodiment of the present invention.

This embodiment will be described based on one example where bumpers as coated resin product, which are one of molded resin components of an automobile, particularly plural types of bumpers each having a different softening temperature zone or a different material in at least either one of a film and a substrate thereof, are mixed together and treated.

As shown in FIG. 1, the film-removal/sorting system according to this system comprises a shredding apparatus 10, a film removing apparatus 20, a sorting apparatus 30, a classifying apparatus 40, and a fragment conveyor 51 and a re-feeding conveyor 52.

<Shredding Apparatus>

The shredding apparatus 10 includes a shredder housing 11, and a pair of cutter mills 12 disposed in the shredder housing 11 to serve as a cutting tool. Each of the cutter mills 12 is provided with a plurality of rotary blades 13 integrally attached to an outer peripheral surface thereof, and supported by the shredder housing 11 in a rotatable manner about a central axis thereof.

A bumper B is fed into the shredder housing 11 through an inlet port 14 formed in an upper wall of the shredder housing 11. The bumper B fed in the shredder housing 11 is roughly shredded into fragments 2 serving as a target material in a random manner within the shredder housing 11 by the cutter mills 12 which are being rotationally driven, and the obtained fragments 2 are fallingly discharged from an outlet port 15 formed in a bottom wall of the shredder housing 11.

The fragments 2 have a variation in size. Further, each of the fragments 2 before being subjected to a film removal treatment still has a film 2b attached on a substrate, i.e., a resin substrate 2a, thereof.

<Film Removing Apparatus>

The film removing apparatus 20 includes a film-removal vessel 21 having an openable top plate, and a disc-shaped rotor 22 disposed inside the film-removal vessel 21. The rotor 22 is provided with a plurality of rotary blades 23 extending upwardly from a top surface thereof. The rotor 22 has a rotation shaft 24 which is pivotally supported relative to a bottom wall of the film-removal vessel 21 and adapted to be driven by a motor 27 disposed in a lower inner space of the film-removal vessel 21.

The film removing apparatus 20 further includes a heater 25 adapted to positively heat the fragments 2 fed in the film-removal vessel 21, and a temperature sensor 26 adapted to detect an internal temperature of the film-removal vessel 21. As to this temperature rising, what is required for achieving the removal of the films 2b as described later is to heat the fragments 2 up to a temperature allowing the fragments 2 to be softened in a non-molten state. Thus, instead of means for positively heating the fragments 2 from the outside, such as the heater 25, the heating may be achieved by controlling a rotational speed of the rotor 22 to adjust an amount of frictional heat to be generated between the fragments 2 being agitated inside the film-removal vessel 21, and the rotary blades 23 or an inner wall surface of the film-removal vessel 21, or an amount of frictional heat to be generated between the fragments 2 themselves, so as to heat the fragments 2 based on the internally generated frictional heat. Specifically, in this case, as substitute for the heater 25 adapted to control the internal temperature of the film-removal vessel 21, the rotational speed of the rotor 22 is controlled to increase the temperature of the fragments 2, and a coolant injection nozzle 28 is additionally provided to inject coolant, such as water, into the film-removal vessel 21 so as to desirably adjust the temperature of the fragments 2 while ensuring the rotational speed of the rotor 22 required for agitation. Either one of the heater 25 and the combination of the control of the rotor 22 and the coolant injection nozzle 28 may be selectively used. Further, both of the heater 25 and the combination may be used, or the coolant injection nozzle 28 may be used in combination with the heater 25.

The fragments 2 shredded by the shredding apparatus 10 are carried by the fragment conveyor 51, and fed into the film-removal vessel 21. In response to the feeding, the rotor 22 is rotationally driven to agitate the fragments 2 by the rotary blades 23, and the internal temperature of the film-removal vessel 21 is increased up to a temperature allowing at least either one of the film 2b and the substrate 2a of each of the fragments 2 to be softened, according to an operation of the heater 25 and other temperature control means. Based on the agitation and the heating, the films 2b will be removed from the substrates 2a of the fragments 2.

Fragments 2 after being subjected to the film removal treatment by the film removing apparatus 20, are formed as a mixture of fragments 2A having no film, i.e., from which the films 2b are fully removed, (these fragments as a film-free material will hereinafter be referred to as "OK fragments"), and fragments 2B having the films 2b left on the substrates 2a (these fragments as an untreated target material will hereinafter be referred to as "NG fragments").

<Sorting Apparatus>

The sorting apparatus 30 is designed to sort the fragments 2 after being subjected to the film removal treatment by the film removing apparatus 20, between an OK fragment 2A and an NG fragment 2B. The sorting apparatus 30 includes a material feeding hopper 31 adapted to feed the fragments 2 consisting of a mixture of OK fragments 2A and NG fragments 2B, a main chute 34 adapted to allow the fragments 2 fed in the material feeding hopper 31 to be slidingly moved therealong in one direction in a free-falling manner, and a branched chute 35 branched from an intermediate portion of the main chute 34, and first and second collection tanks 36, 37 adapted to collect OK fragments 2A and NG fragments 2B, respectively.

The main chute 34 is disposed to be inclined by a given angle so as to extend from a bottom of the material feeding hopper 31 to the first collection tank 36, and an area around a region of the main chute 34 on an immediately upstream side of a branch position between the main chute 34 and the branched chute 35 is used as a detection space 38 for detecting (the film 2b attached on) an NG fragment 2B. Further, the region of the main chute 34 corresponding to the detection space 38 is made of a transparent and colorless material to facilitate the detection of an NG fragment 2B.

Instead of providing the transparent/colorless region in the main chute 34 correspondingly to the detection space 38, any other suitable means for allowing an optical image of an object to be transmitted through the main chute 34, such as a partial cutout formed in the above region of the main chute 34, may be used.

In the vicinity of the detection space 38, a first CCD sensor 39 is disposed on the side of a first surface of the main chute 34, and a first background member 41 is disposed on the side of a second, opposite, surface of the main chute 34 in opposed relation to the first CCD sensor 39. Further, a second CCD sensor 42 is disposed on the side of the second surface of the main chute 34, and a second background member 43 is disposed on the side of the first surface of the main chute 34 in opposed relation to the second CCD sensor 42, in such a manner that an optical axis between the second CCD sensor 42 and the second background member 43 intersects with that between the first CCD sensor 39 and the first background member 41 at a given angle. Each of the first and second background members 41, 43 has a background color, such as black, which is different from a color of the film.

The first CCD sensor 39 is an optical sensor adapted to detect an NG fragment 2B from the side of the first surface of the main chute 34 (from the side of one surface of the main chute 34 on which the falling fragments 2 are actually located), and the second CCD sensor 42 is an optical sensor adapted to detect an NG fragment 2B in a detection direction different from that of the CCD sensor 39, i.e., from the side of the second surface of the main chute 34 (from the side of the other surface of the main chute 34 on the opposite side of the surface on which the falling fragments 2 are actually located). Each of the first and second CCD sensors 39, 42 is adapted to detect the film based on a difference in luminance, chromaticness or hue between the background color of the first and second background members 41, 43 and the color of the film.

As above, the detection of whether the film is attached on the substrate is performed from two different directions by the first and second CCD sensors 39, 42. This makes it possible to accurately detect the fragment 2 having a residual film, irrespective of a posture of the fragment 2.

Further, each of the first and second CCD sensors 39, 42 is adapted to detect the film 2b based on a difference in luminance, chromaticness or hue between the background color and the film color. This makes it possible to minimize error detection and effectively achieve enhanced film-detection accuracy in a simplified manner.

In this embodiment, a plurality of color fluorescent lamps 44 are disposed in the vicinities of respective imaging lenses of the first and second CCD sensors 39, 42. In view of reducing missing of the film detection, it is preferable to select green as a luminescent color of each of the color fluorescent lamps 44.

Figure 3:
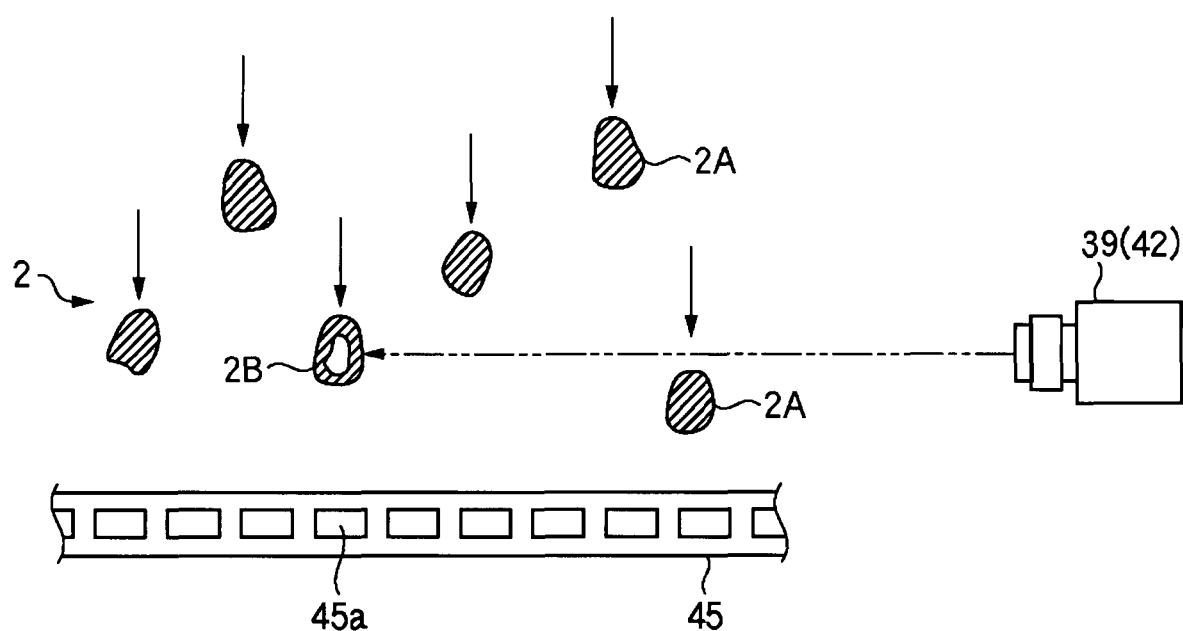
FIG. 3 is a schematic diagram showing an injection nozzle of an air injector.

An air injector 45 is disposed in the vicinity of the branch position between the main chute 34 and the branched chute 35, and directed toward the branched chute 35 to blow air against the fragments 2. As shown in FIG. 3, the air injector 45 has a plurality of air injection nozzles 45a arranged to extend over the entire width of a falling path of the fragments 2. The air injector 45 is operable, in response to detection of an NG fragment 2B by the CCD sensors 39, 42, to blow air against the NG fragment 2B in time with falling of the NG fragment 2B so as to change a path of the falling NG fragment 2B from the main chute 34 to the branched chute 35. Thus, NG fragments 2B can be sorted from the fragments 2, i.e., separated from OK fragments 2A by a simplified structure of blowing air against the NG fragment 2B to change a moving direction of the NG fragment 2B, the efficient detection of the films of the large number of fragments 2 by the CCD sensors 39, 42 can be performed.

As above, the sorting apparatus 30 allows OK fragments 2A and NG fragments 2B to fall, respectively, in the first collection tank 36 and the second collection tank 37, so as to sort the fragments 2 between the OK fragments 2A and the NG fragments 2B.

Subsequently, the NG fragments 2B collected in the second collection tank 37 are re-fed into the film removing apparatus 20 through the re-feeding conveyor 52, and subjected to the film removal treatment. After the film removal treatment, the NG fragments 2B are carried to the sorting apparatus 30, and re-subjected to the sorting operation. NG fragments 2B re-sorted through the sorting operation will be returned to the film removing apparatus 20 again to repeat the film removal treatment and the sorting operation. In this repetitive process, a treatment temperature in the film removing apparatus 20 is set at a higher temperature stepwise in response to an increase in the number of times of the film removal treatments, as described later.

<Classifying Apparatus>

Figure 2:
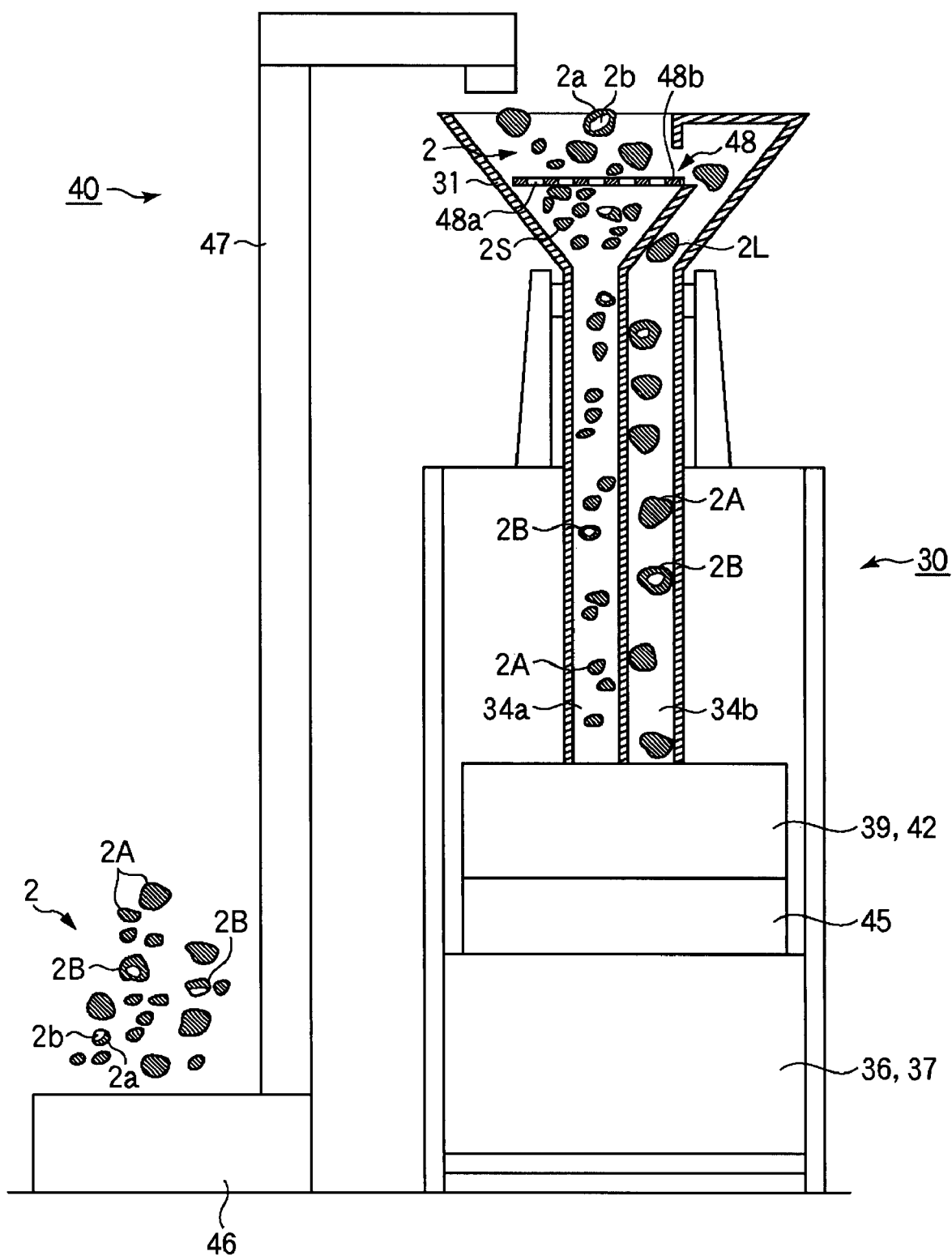
FIG. 2 is a schematic diagram showing the structure of a classifying apparatus.

FIG. 2 shows the structure of the classifying apparatus 40.

The classifying apparatus 40 is disposed above the sorting apparatus 30. The classifying apparatus 40 includes a material inlet 46 adapted to receive the fragments 2 fed from the film removing apparatus 20 after being subjected to the film removal treatment, i.e., a mixture of OK fragments 2A and NG fragments 2B, a lift conveyer 47 adapted to carry the fragments 2 fed through the material inlet 46, upwardly and supply the fragments 2 to the material feeding hopper 31 of the sorting apparatus 30, and a sieving device 48 adapted to classify the fragments 2 into a plurality of groups depending on a particle size (or grading).

The sieving device 48 is provided with a perforated plate 48b formed with a large number of sieving holes 48a having a given diameter, and adapted to classify the fragments 2 fed from the hopper 31, into small fragments 2S which can pass through the sieving holes 48a and large fragments 2L which cannot pass through the sieving holes 48a.

The small fragments 2S free-fall through a first main chute 34a, and the large fragments 2L free-fall through a second main chute 34b. While the classifying apparatus 40 in this embodiment is designed to classify the fragments 2 into two groups of the small fragments 2S and the large fragments 2L, it may be designed to classify the fragments 2 into three groups or more.

The classification of the fragments 2 based on a particle size makes it possible to accurately detect the films of the substrates of the fragments 2. Specifically, the fragments 2 randomly shredded by the shredding apparatus 10 have a variation in size. Thus, if the fragments 2 are fed directly into the sorting apparatus 30, it is likely that, during detection of the films of the fragments 2, the small fragment 2S having a residual film 2b is hidden behind the large fragment 2L which has succeeded in removing the film 2b from the substrate 2a thereof, to cause deterioration in film-detection accuracy. In contrast, when the fragments 2 are fed into the sorting apparatus 30 after being classified, the above undesirable situation can be avoided to improve the film-detection accuracy.

Control Configuration

Figure 4:
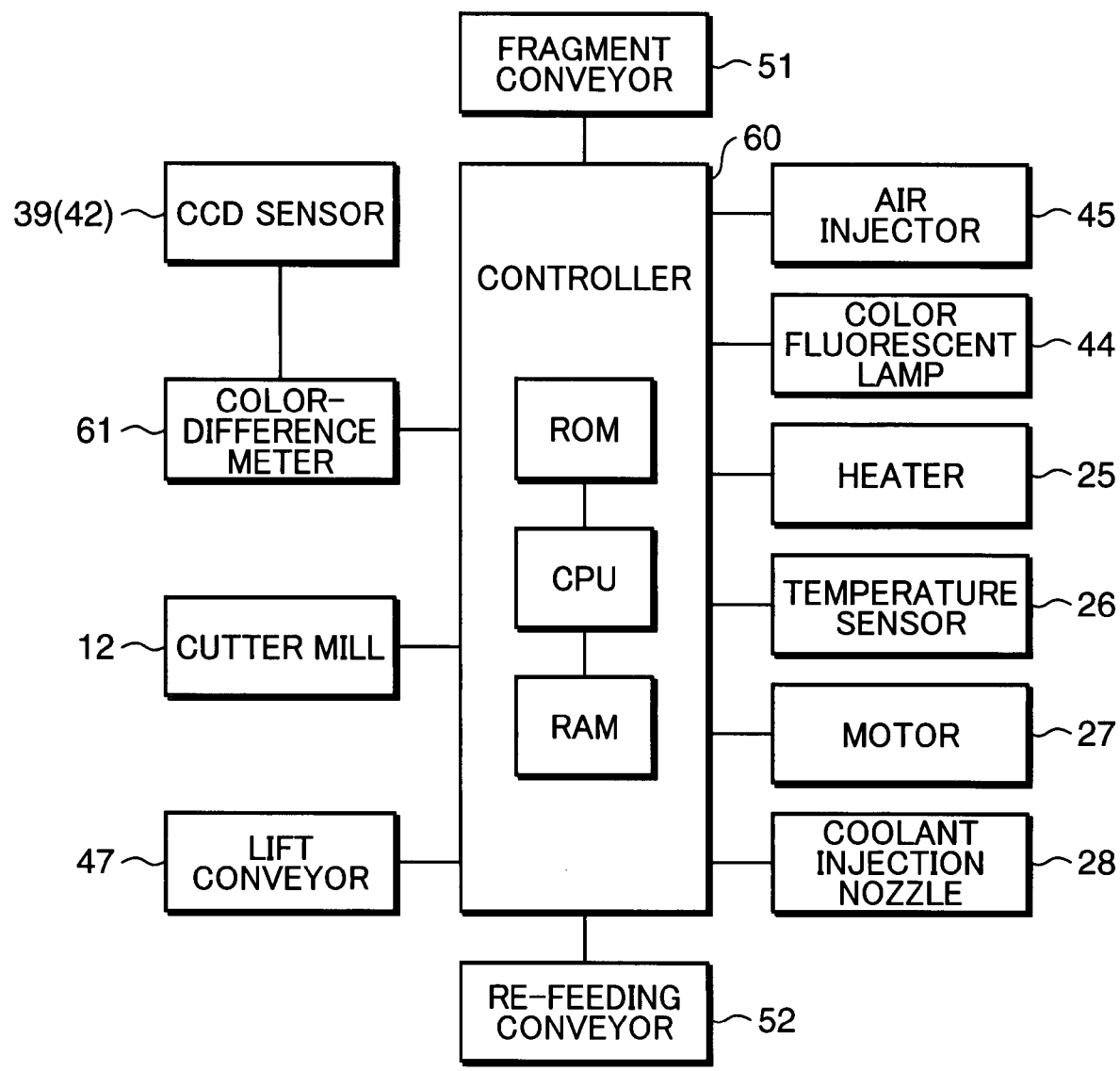
FIG. 4 is a block diagram showing a control configuration of the film-removal/sorting system according to the embodiment.

FIG. 4 is a block diagram showing a control configuration of the film-removal/sorting system according to this embodiment.

In FIG. 4, a controller 60 (equivalent to control means set forth in the appended claims) comprises a CPU adapted to performer a given processing based on after-mentioned various detection signals, a ROM storing a control program for controlling the film-removal/sorting system, and a RAM adapted to temporarily store a calculation result and other data. The controller 60 is operable to sequentially execute after-mentioned various processes of the shredding operation, the film removal treatment and the sorting operation, according to the control program stored in the ROM.

Specifically, the controller 60 is operable to execute a control of rotationally driving the cutter mills 12 of the shredding apparatus 10 and driving the fragment conveyer 51 to carry the fragments 2 from the shredding apparatus 10 to the film removing apparatus 20, according to the control program stored in the ROM.

Then, the controller 60 is operable, based on detection signals from the CCD sensors 39, 42 and a color-difference meter 61, to control the air injector 45, according to the control program stored in the ROM. More specifically, the controller 60 is operable, based on a detection result of the CCD sensors 39, 42, to determine the fragment 2 having a residual film (i.e. NG fragment 2B) and then control the air injector 45 so as to separate the NG fragment 2B from a group of OK fragments 2A.

Then, in order to re-feed the NG fragments 2B collected in the second collection tank 37, into the film removing apparatus 20, the controller 60 is operable to drive the re-feeding conveyer 52 so as to carry the NG fragments 2B from the sorting apparatus 30 to the film removing apparatus 20, according to the control program stored in the ROM.

The RAM stores after-mentioned parameters required for the control, such as an accumulated re-feeding number n, a threshold value n0, a treatment temperature Tn, and a reference value (reference luminance) for discriminating between an OK fragment 2A and an NG fragment 2B.

[Process of Film Removal Treatment/Sorting Operation]

Figure 5:
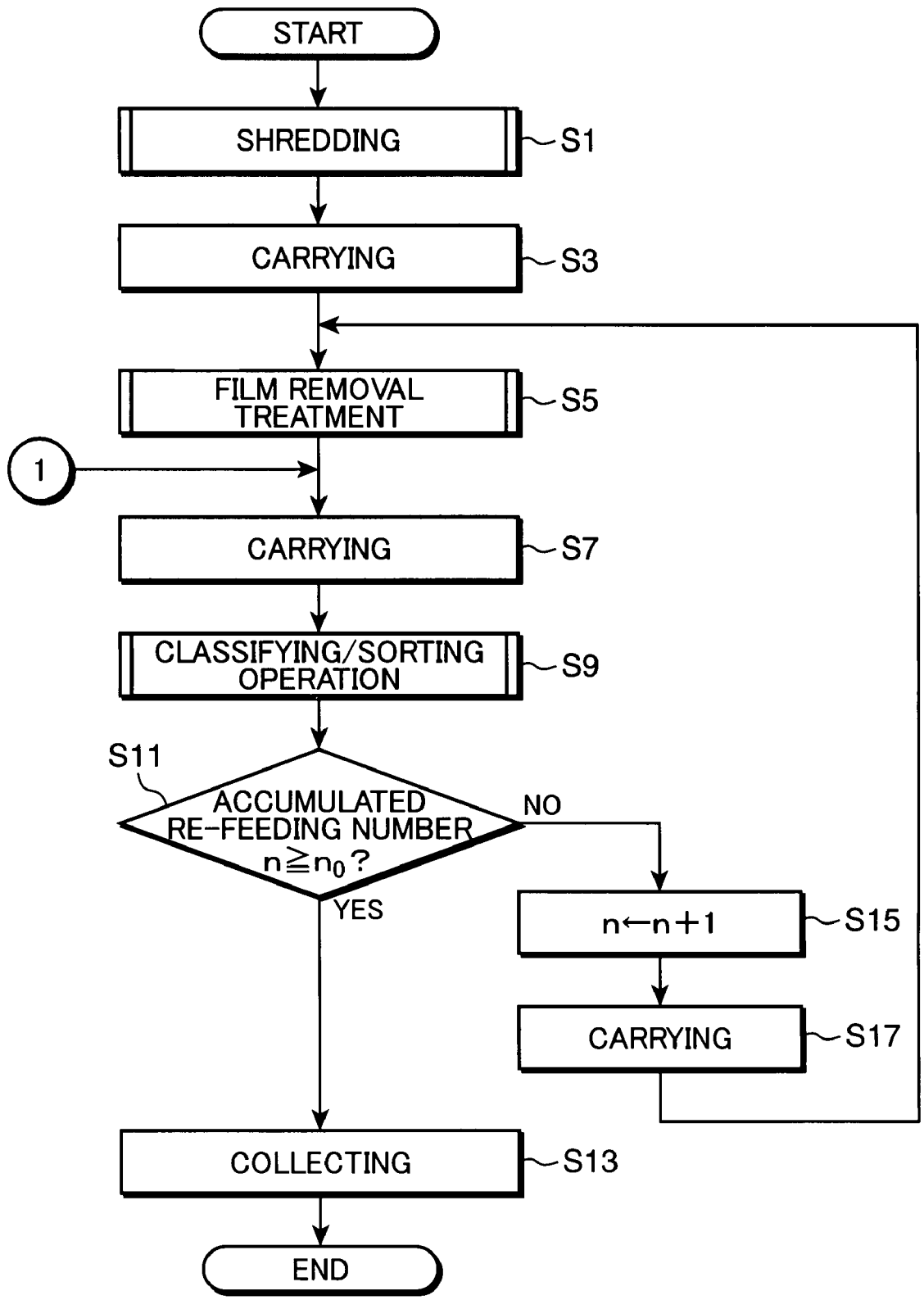
FIG. 5 is a flowchart generally showing a process of film removal treatment/sorting operation in the film-removal/sorting system according to the embodiment.

FIG. 5 is a flowchart generally showing a process of film removal treatment/sorting operation in the film-removal/sorting system according to this embodiment.

In FIG. 5, upon feeding plural types of used rein bumpers B into the shredding apparatus 10, the controller 60 operates to rotationally drive the cutter mills 12 in the shredder housing 11 so as to shred the rein bumpers B (Step S1).

Then, the controller 60 operates to drive the fragment conveyer 51 so as to carry fragments 2 discharged from the shredding apparatus 10, to the film removing apparatus 20 (Step S3).

Then, the controller 60 operates to drivingly control the heater 25 and the motor 27 of the film removing apparatus 20 so as to heat the fragments 2 up to a given temperature under agitation to perform the film removal treatment (Step S5).

Then, the controller 60 operates to drive the lift conveyer 47 of the classifying apparatus 40 so as to carry the fragments 2 fed from the film removing apparatus 20 to the sorting apparatus 30 (Step S7).

Then, the controller 60 operates to activate the CCD sensors 39, 42, the color fluorescent lamps 44 and the air injector 45 of the sorting apparatus 30 so as to perform a color-difference measurement and the sorting operation for NG fragments 2B (Step S9).

Then, the controller 60 determines whether an accumulated re-feeding number n (the number of times of re-feeding of NG fragments 2B from the sorting apparatus 30 to the film removing apparatus 20; an initial value thereof is set to zero) is equal to or greater than a threshold value n0 (Step S11). If it is determined that the accumulated re-feeding number n is equal to or greater than the threshold value n0, OK fragments 2A in the first collection tank 36 and NG fragments 2B in the second collection tank 37 will be collected, and the process of film removal treatment/sorting operation will be terminated (Step S13).

When it is determined that the accumulated re-feeding number n is less than the threshold value n0, the controller 60 operates to increment the accumulated re-feeding number n by one (Step S15), and drive the re-feeding conveyer 52 so as to carry NG fragments 2B collected in the second collection tank 37 to the film removing apparatus 20 and re-feed the NG fragments 2B into the film removing apparatus 20 (Step S17).

Subsequently, the controller 60 operates to repeatedly perform the film removal treatment (Step S5) and the sorting operation (Step S9) until the accumulated re-feeding number n becomes equal to or greater than the threshold value n0. During the repetitive process, the controller 60 operates to set a treatment temperature Tn of the film removing apparatus 20 at a higher value stepwise every time the accumulated re-feeding number n is incremented, within a temperature range equal to or less than a highest one Tmax of softening temperatures of the films and the substrates of plural types of NG fragments 2B.

The threshold value n0 of the accumulated re-feeding number n represents a target total number of the film removal treatments to be performed while changing the treatment temperature Tn. Specifically, the threshold value n0 is determined depending on NG fragments 2B each having a different type of film and/or substrate, i.e., NG fragments 2B each having a different softening temperature in at least one of a film and a substrate thereof.

[Process of Film-Removal Treatment]

Figure 6:
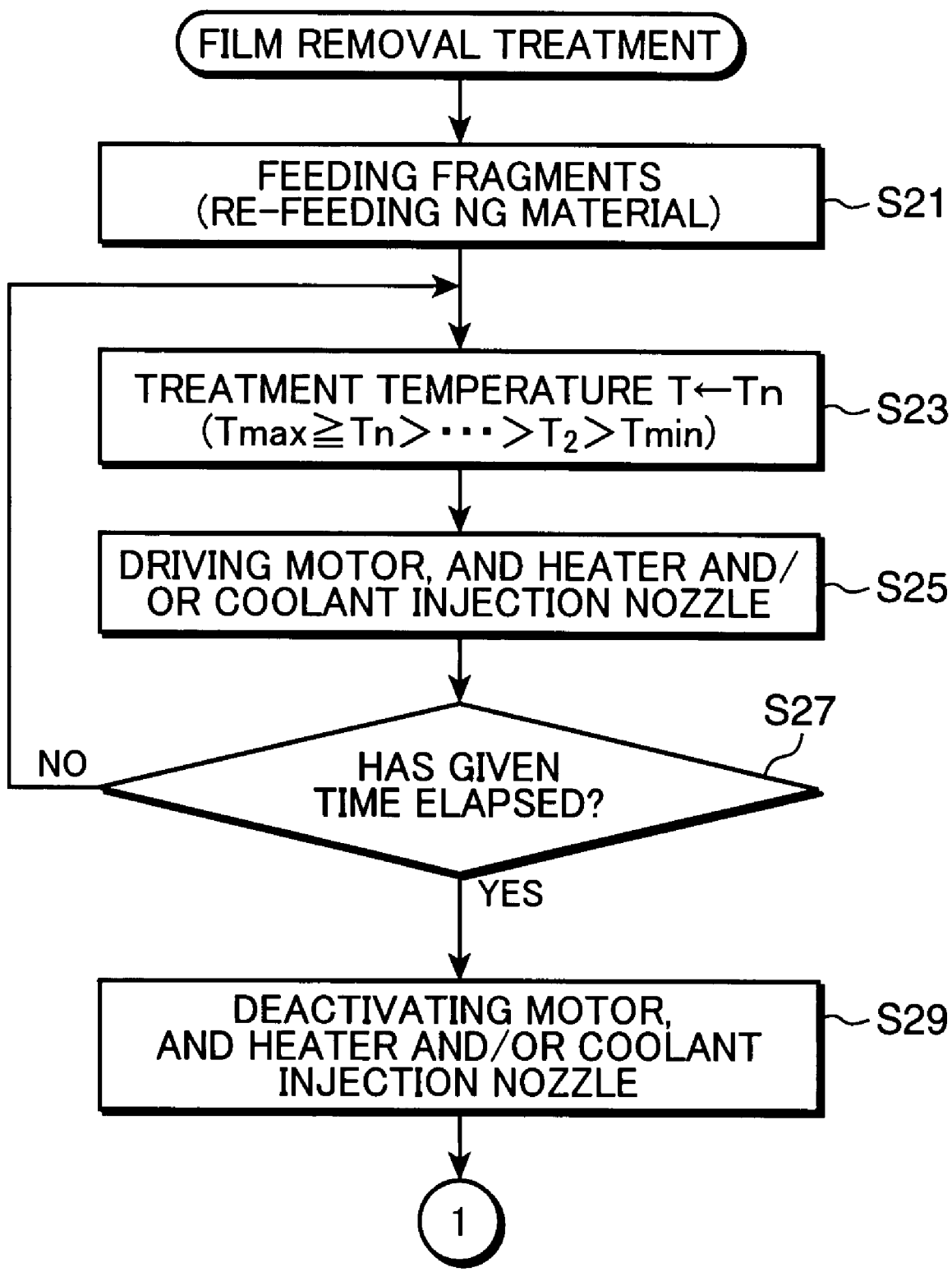
FIG. 6 is a flowchart showing the detail of a process of the film-removal treatment.

FIG. 6 is a flowchart showing the detail of a process of the film removal treatment to be executed in Step S5 in FIG. 5.

In FIG. 6, in response to feeding the fragments 2 into the film removing apparatus 20 (S21), the controller 60 operates to set an internal temperature T in the film-removal vessel 21 at a treatment temperature Tn (S23). The "n" represents the accumulated re-feeding number (the number of times of re-feedings of NG fragments 2B) as described in connection with FIG. 5, and the treatment temperature Tn is set at a higher value in proportion to the accumulated re-feeding number n. Specifically, when the accumulated re-feeding number n is zero (i.e., in a 1st film removal treatment), the treatment temperature $T_n$ is set at a lowest one Tmin of softening temperatures of the films and the substrates of the entire fragments 2. When the accumulated re-feeding number n is one (i.e., in a 2nd film removal treatment), the treatment temperature $T_n$ is set at a second-lowest one of the softening temperatures of the films and the substrates of the entire fragments 2, i.e., a softening temperature $T_2$ next highest to the softening temperature Tmin for the 1st film removal treatment. In this manner, the treatment temperature Tn is set at a higher value stepwise every time NG fragments 2B are re-fed, within a temperature range equal to or less than a highest one Tmax of softening temperatures of films and substrates of plural types of fragments 2 (Tmax≧Tn>- - - $T_2$>Tmin).

Then, the controller 60 operates to perform the film removal treatment in such a manner that the heater 25 is controlled to generate a given amount of heat, or the motor 27 and the coolant injection nozzle 28 are controlled, respectively, to rotate the rotor 22 at a given speed and inject a given amount of coolant, or the heater 25, and the motor 27 and/or the coolant injection nozzle 28, are controlled in the above manner, so as to adjust the treatment temperature Tn in the film removal vessel 21, while driving the motor 27 to agitate the fragments 2 (or NG fragments 2B), until a given time elapses (Steps S25 and S27).

When the given time has elapsed, the controller 60 operates to deactivate the heater 25 and other associated components so as to terminate the film removal treatment (Step S29).

Then, if NG fragments 2B are re-fed into the film removing apparatus 20 after being sorted by the sorting apparatus 30, the controller 60 will operate to set an internal temperature of the film removal vessel 21 at the treatment temperature $Tn[T_2$ ($Tmax \leqq T_2 > Tmin$) if the treatment temperature during the previous film removal treatment is Tmin] (S23), and repeat the above steps.

As above, the film removal treatment and the sorting operation are repeatedly performed while setting the treatment temperature at a higher value stepwise in such a manner that a temperature of the fragments 2 is increased up to a lowest one of softening temperatures of films and substrates of the fragments 2 to perform a 1st film removal treatment, and NG fragments 2B returned to the film removing apparatus 20 after being sorted by the sorting apparatus 30 is subjected to a 2nd film removal treatment at a softening temperature next highest to the lowest softening temperature during the 1st film removal treatment, and then re-sorted by the sorting apparatus 30 to separate NG fragments 2B to be returned to the film removing apparatus 20.

The treatment temperature Tn may be set by pre-checking respective softening temperatures of (materials of substrates and films) of plural types of resin bumpers B to be subjected to the film removal treatment, and setting the obtained softening temperatures in ascending order as follows: Tmin, - - - $Tn \leqq Tmax$. Further, the threshold value n0 of the accumulated re-feeding number n is determined based on how many different softening temperatures the films and the substrates of the plural types of resin bumpers B have.

A softening temperature of a film or a substrate (a temperature at which the film or substrate is softened to an extent allowing the film to be removed from the substrate) of a resin bumper B has a certain level of range or zone. If plural types of films or substrates are totally different in softening temperature zone from each other (the softening temperature zones thereof have no overlapping area), the conventional technique of heating fragments up to a single temperature will cause a problem that some types of films are left as it is absolutely without being removed. In the above technique, the film removal treatment is performed in a stepwise manner while adequately setting the treatment temperature Tn in conformity to each of the different temperature zones. Thus, even if plural types of films or substrates are totally different in softening temperature zone from each other, the different types of films can be reliably removed from substrates thereof. In this case, respective softening temperature zones of plural types of films and substrates can be pre-checked to set the treatment temperature Tn based on the softening temperature zones without any difficulty.

Preferably, a treatment time of the film removal treatment is set to avoid becoming excessively long or short.

Figure 8:
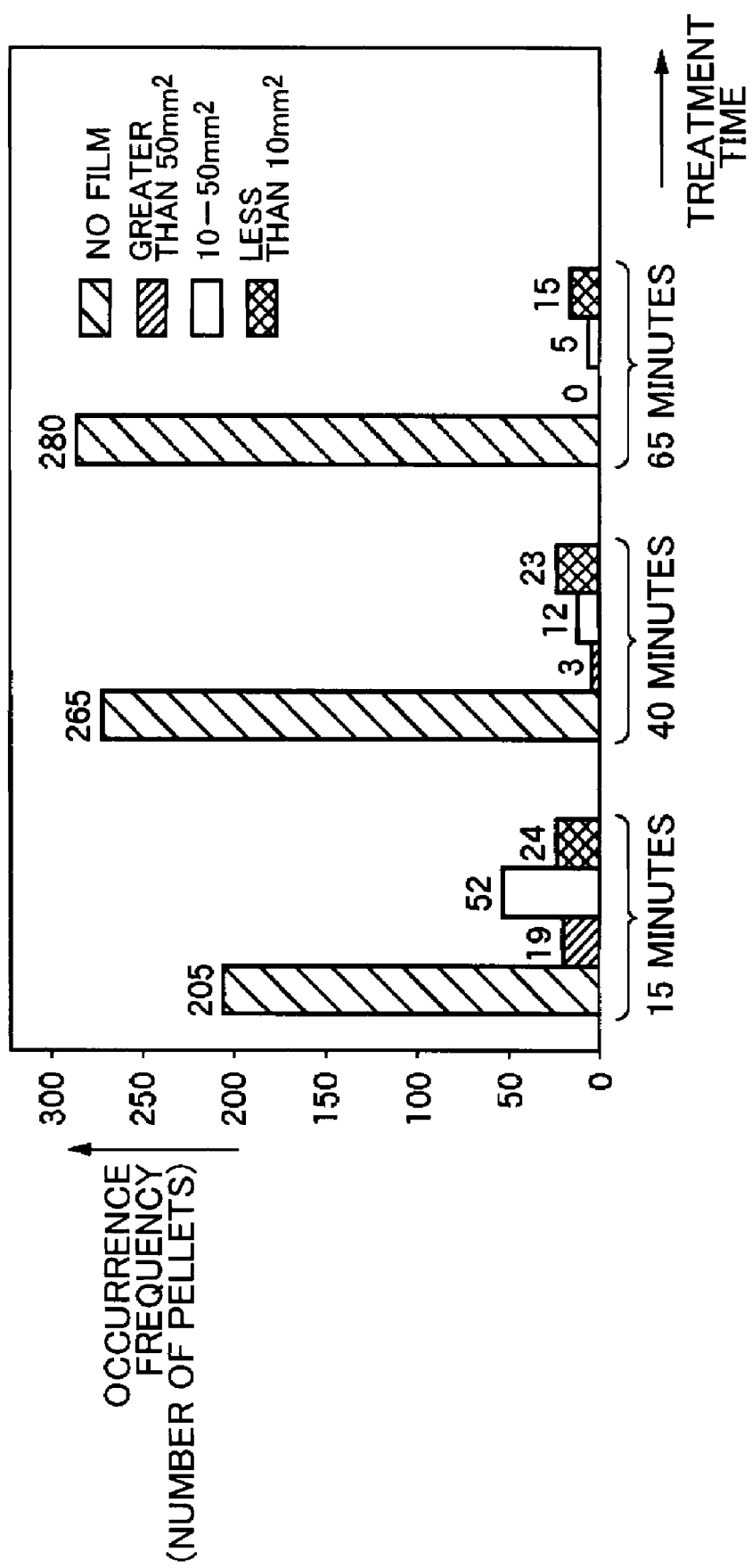
FIG. 8 is a graph showing a relationship between a film removal treatment time and an occurrence frequency (number) of fragments for each residual-film coated area.

FIG. 8 is an actual data showing a relationship between a film removal treatment time and an occurrence frequency (number) of fragments 2 for each residual-film coated area, wherein: a bar graph with hatched lines indicates an occurrence frequency of fragments 2 which has succeeded in fully removing films through the film removal treatment; a bar graph with thick hatched lines indicates an occurrence frequency of fragments 2 having a residual-film coated area of greater than 50 mm$^2$; a bar graph with no hatched line indicates an occurrence frequency of fragments 2 having a residual-film coated area in the range of 10 to 50 mm$^2$; and a bar graph with cross-hatched lines indicates an occurrence frequency of fragments 2 having a residual-film coated area of less than 10 mm$^2$.

As seen in FIG. 8, although most films are removed when the treatment time exceeds 60 minutes (see bar graphs for 65 minutes), the treatment time is excessively extended, and substrates are significantly lost to cause deterioration in collection rate.

While some fragments 2 having residual films in a medium level of area (10 to 50 mm$^2$ or greater than 50 mm$^2$) remain as seen in the bar graphs for 15 minutes and 40 minutes, these fragments 2 will be able to be reliably sorted as NG fragments 2B through the subsequent sorting operation. Thus, this level of treatment time can minimize a loss of substrates to obtain enhanced collection rate, while facilitating cut-down of the treatment time.

If the treatment time is reduced to less than 15 minutes, a specific type of film originally intended to be removed will also remain to cause deterioration in film removal rate. Thus, the film removal treatment time is preferably set in the range of 10 to 50 minutes.

<Process of Sorting Operation>

Figure 7:
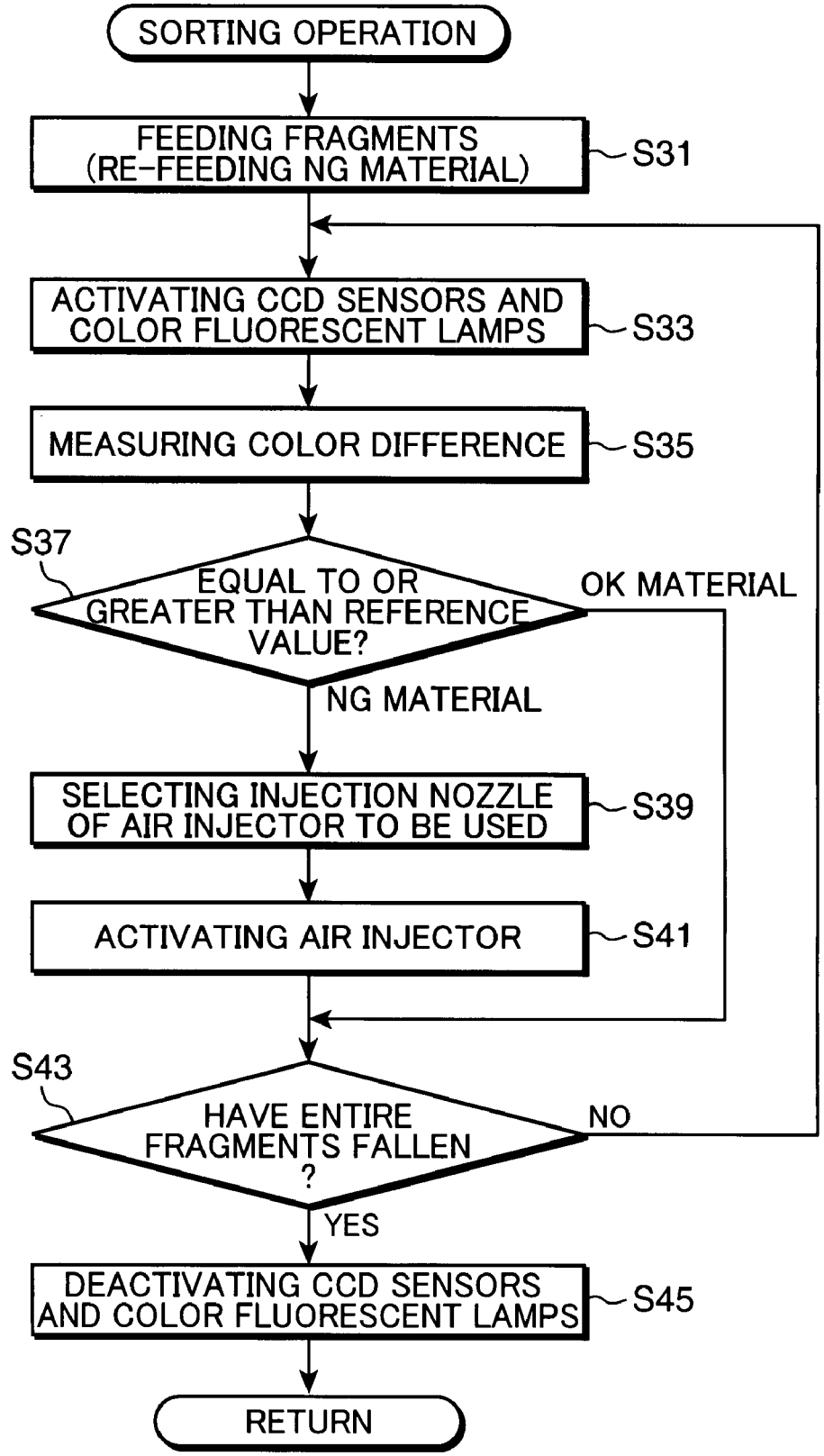
FIG. 7 is a flowchart showing the detail of a process of the sorting operation.

FIG. 7 is a flowchart showing the detail of a process of the sorting operation to be executed in Step S9 in FIG. 5.

In FIG. 7, upon feeding fragments 2 (or re-fed NG fragments 2B) into the sorting apparatus 30 through the classifying apparatus 40 (Step S37), the controller 60 operates to activate the CCD sensors 39, 42 and the color fluorescent lamps 44 to image, in the detection space 38, the fragments 2 (or re-fed NG fragments 2B) which are free-falling along the main chute 34, to create a film-detecting image (Step S33).

Then, the controller 60 operates to measure a color difference based on the color-difference meter 61 (Step S35).

Then, the controller 60 compares the measured color difference with a reference value so as to determine whether the measured color difference is equal to or greater than the reference value (Step S37). If it is determined that the measured color difference is less than the reference value, the corresponding fragment 2 (or re-fed NG fragment 2B) will be judged as an OK fragment 2A and allowed to fall from the chute 34 in the first collection tank 36 without activating the air injector 45.

When it is determined that the measured color difference is equal to or greater than the reference value, the corresponding fragment 2 (or re-fed NG fragment 2B) is judged as an NG fragment 2B, and at least one of the plurality of injection nozzles 45a (see FIG. 3) of the air injector 45 is selected for use in blowing air against the NG fragment 2B. Specifically, at least one of the injection nozzles 45a located at a specific position is selected to blow air therefrom against the falling NG fragment 2B when it reaches a position opposed to the specific position of the selected injection nozzle 45 (S39).

Then, the controller 60 operates to blow air from the selected injection nozzle 45a at a timing when the falling NG fragment 2B reaches the position opposed to the specific position of the selected injection nozzle 45a of the injector 45, so as to change a falling path of the NG fragment 2B from the main chute 34 to the branched chute 35 (Step S41). That is, a moving direction of the NG fragment 2B along the main chute 34 is changed to a different moving direction from the moving direction along the main chute 34 to separate the NG fragment 2B from a group of OK fragments 2A.

Then, the controller 60 determines whether the entire fragments 2 fed in Step S31 (or the entire re-fed NG fragments 2B) have fallen (Step S43). When it is determined that the entire fragments 2 (or the entire re-fed NG fragments 2B) have fallen, the controller 60 operates to deactivate the CCD sensors 39, 42 and the color fluorescent lamps 44.

If it is determined that the entire fragments 2 (or the entire re-fed NG fragments 2B) have not fallen, Step S33 and the subsequent steps will be continued until the entire fragments 2 (or the entire re-fed NG fragments 2B) fall.

While the above process of selection operation is configured for the small fragments 2S, a process for the large fragments 2L may be configured in the same manner (its description will be omitted).

For example, the OK fragments 2A may be formed into resin pellets using an extruding machine, and reused in injection molding of resin bumpers or the like, using an injection molding machine. The NG fragments 2B may be re-fed to the film removing apparatus 20 and then re-sorted between OK fragments 2A and NG fragments 2B by the sorting apparatus 30. Subsequently, the film removal treatment and the sorting operation will be repeatedly performed, and finally remaining NG fragments 2B may be used for low grade products (e.g., components invisible from outside), such as undercovers for automobiles.

Another Embodiment

Figure 9:
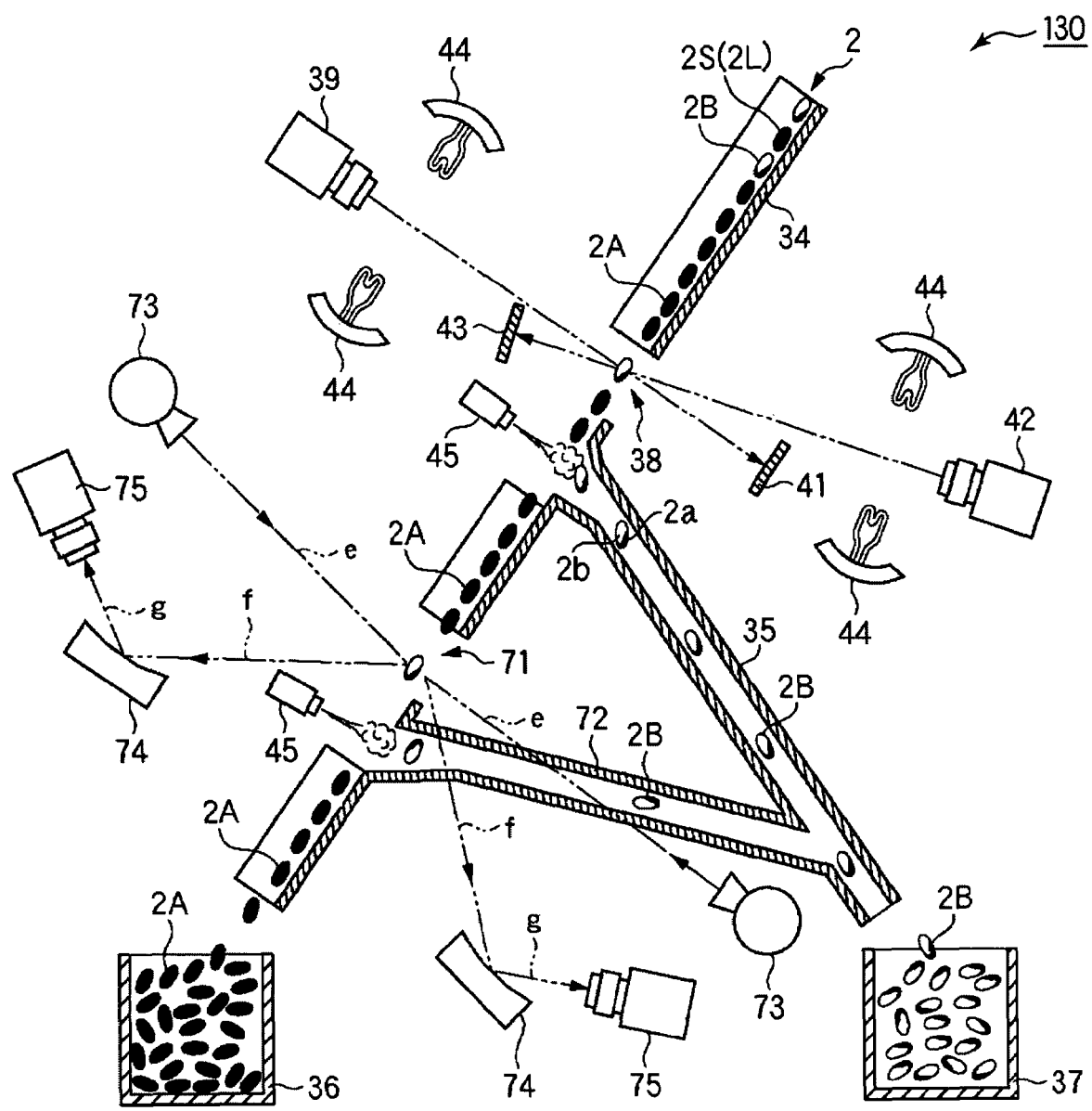
FIG. 9 is a schematic diagram showing a sorting apparatus in a film-removal/sorting system according to another embodiment of the present invention.
Figure 10A:
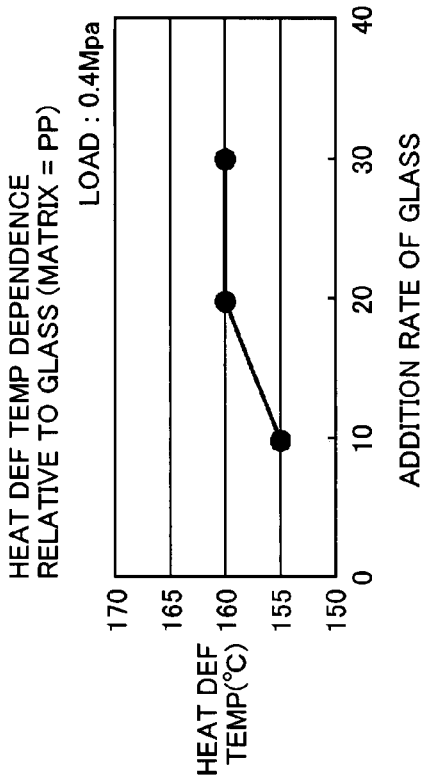
FIGS. 10A to 10D are graphs showing a relationship between a type of additive/resin matrix and a heat deflection temperature of a resin material.
Figure 10C:
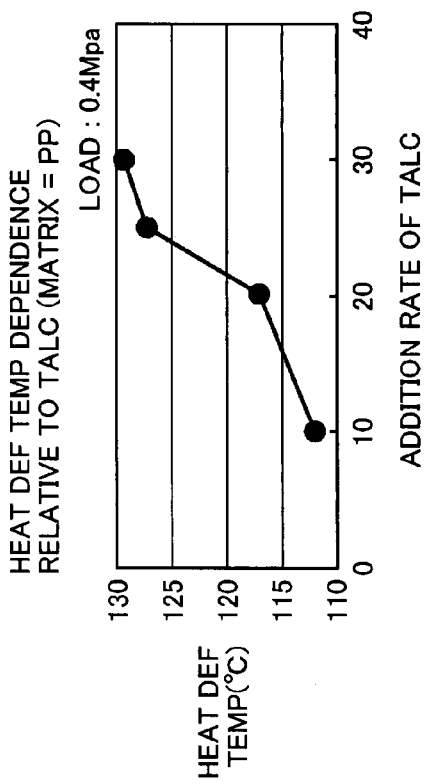
Figure 10B:
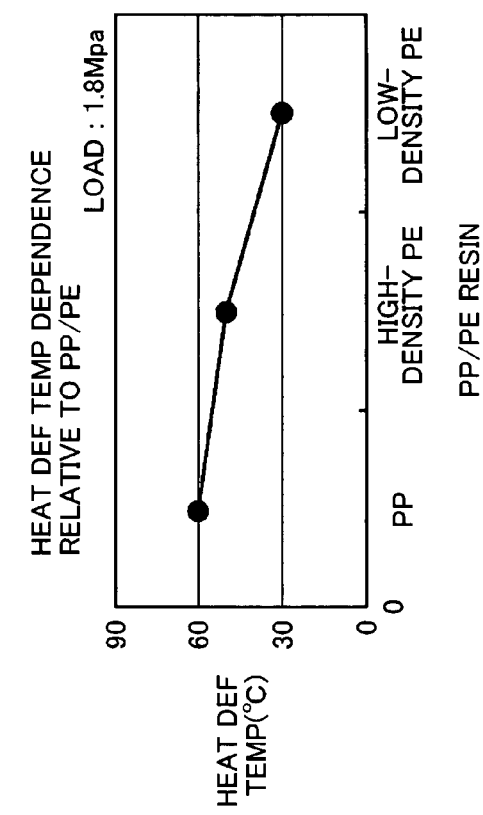
Figure 10D:
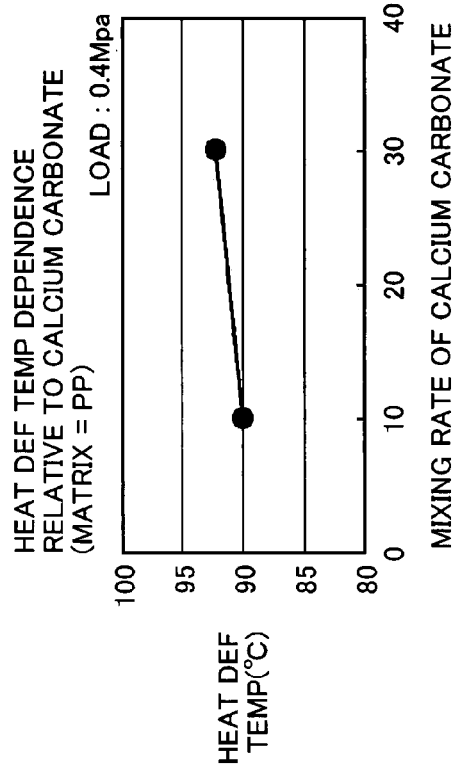

FIG. 9 is a schematic diagram showing a sorting apparatus in a film-removal/sorting system according to another embodiment of the present invention.

In this embodiment, a fluorescent X-ray is used for detecting a wavelength specific to titanium oxide $TiO_2$ as a primary component of a white pigment, or a wavelength specific to chlorine Cl as a primary component of a primer (under coat) under a black coating, to reliably prevent missing of the film detection.

For this purpose, in addition to the structure of the sorting apparatus 30 illustrated in FIG. 1, a sorting apparatus 130 in this embodiment includes a second detection space 71 formed below (i.e., on a downstream side of) the first detection space 38 around the main chute 34, and a second branched chute 72 breached from a region of the main chute 34 corresponding to the second detection space 71 and connected to the first detection space 38. NG fragments 2B falling through the second branched chute 72 is collected in the second collection tank 37.

A second air injector 45 having the same structure as that of the first air injector 45 is disposed at a branch position between the main chute 34 and the second branched chute 72.

The sorting apparatus 130 in this embodiment further includes an X-ray tube 73 adapted to emit an X-ray e for detecting an NG fragment 2B included in fragments 2 which are falling through the second detection space 71. Further, a spectral crystal 74 is disposed to spectrally divide a fluorescent X-ray produced from the fragments 2 excited by radiation of the X-ray e, into spectral components, and a third CCD sensor 75 adapted to detect only an X-ray g having a specific wavelength, which is one of the spectral components.

Two sets of the X-ray tube 73, the spectral crystal 74 and the third CCD sensor 75 are disposed on both sides of the first and second surfaces of the main chute 34, respectively. Titanium oxide $TiO_2$ as a primary component of a white pigment is detected based on a wavelength of titanium Ti. Thus, in an operation of detecting the titanium oxide $TiO_2$, a spectral crystal capable of producing a spectrally divided X-ray g having a wavelength of 4.508 Å which is a wavelength of titanium Ti may be selected as the spectral crystal 74. In an operation of detecting chlorine Cl as a primary component of a primer, a spectral crystal capable of producing a spectrally divided X-ray g having a wavelength of 2.621 Å which is a wavelength of chlorine Cl may be selected as the spectral crystal 74.

The second air injector 45 is operable, in response to detection of a specific X-ray g [i.e., detection of an NG fragment 2B containing titanium Ti or chlorine Cl (i.e., having a film)] by the third CCD sensor 75, to drivenly blow air against the NG fragment 2B at a timing when the NG fragment 2B fallingly reaches a position opposed to the second air injector 45, so as to change a falling path of the NG fragment 2B from the main chute 34 to the second branched chute 72. Thus, as compared with the sorting apparatus 30 designed to detect an NG fragment 2B only by a determination based on luminance, chromaticness or hue, the sorting apparatus 130 can more reliably prevent mission of the film detection.

As above, the sorting apparatus 130 in the second embodiment makes it possible to more reliably prevent missing of the detection of NG fragments 2B so as to drastically improve the film removal rate. In FIG. 9, the first and second CCD sensors 39, 42 adapted to detect a film itself based on image recognition are disposed on an upstream region of the main chute 34, and the third CCD sensor 75 having an X-ray detection function of detecting a specific material (Ti or Cl) contained in a film are disposed on a downstream region of the main chute 34. Alternatively, the film detection may be performed only by the third CCD sensor 75.

The sorting apparatus 130 in this embodiment designed to determine the presence of a film attached on a substrate based on detection of a specific material contained in the film can also facilitate the detection of NG fragments 2B, as with the sorting apparatus 30 illustrated in FIG. 1. In addition, the sorting apparatus 130 is designed to emit an X-ray to the fragment 2 and detect an X-ray with a specific wavelength excitedly produced from a specific material contained in a film of the fragment 2. Thus, even if respective colors of a substrate and a film of a fragment 2 are identical or similar to each other, the film-detection accuracy can be effectively improved in a simplified manner.

The remaining structures illustrated in FIG. 9 are substantially the same as those in FIG. 1. Thus, the same component or element as that in FIG. 1 is defined by the same reference numeral or code, and its description will be omitted.

In the film-removal/sorting systems according to the above embodiments, plural types of coated resin products are softened in a non-molten state in such a manner as to be heated stepwise up to a temperature selected from softening temperatures of substrates and films thereof in ascending order, to perform plural cycle of the film removal treatments at the respective softening temperatures, while performing the sorting operation depending on the presence of a residual film, every time each of the film removal treatments is completed. Thus, even when the film removal treatment and the sorting operation are performed for a mixture of plural types of coated resin products, the film removal rate (accuracy) in the film removal treatment can be improved in a simplified manner to achieve a higher recycling rate and contribute to quality improvement in recycled products. Specifically, in a process of recycling a mixture of plural types of resin bumpers B as a molded resin component of a used automobile, the film removal rate (accuracy) in the film removal treatment can be improved to achieve a higher recycling rate and contribute to quality improvement in recycled products.

Further, even if plural types of coated resin products different in softening temperature and/or material (thermosetting resin, thermoplastic resin) are subjected to the film removal treatment, a treatment temperature during the film removal treatment can be readily set, depending on characteristics of films and substrates of the coated resin products during the film removal treatment.

Before the film removal treatment, the coated resin products are subjected to the shredding operation. This makes it possible to perform the film removal treatment and the sorting operation using a smaller-size apparatus without any difficulty.

In the film removal treatment, shredded fragments are agitated inside the film removing apparatus 20. Thus, an enhanced film removal rate can be obtained in a simplified manner.

In the sorting operation, a residual film on a substrate or a specific material contained in the film is detected using the CCD sensors 39, 42 or the CCD sensor 75. Thus, NG fragments 2B can be sorted in a simplified manner.

In the sorting operation, NG fragments 2B may be detected based on a difference in luminance, chromaticness or hue between a background color and a color of an optical image of a target material detected by the CCD sensors 39, 42. This makes it possible to reduce error detection of NG fragments 2B so as to effectively obtain enhanced film-detection accuracy in a simplified manner.

In the sorting operation, NG fragments 2B are detected using the CCD sensors 39, 42 while allowing fragments 2 after being subjected to the film removal treatment to fall in one direction, and air is blown against the falling NG fragments 2B to change a moving direction of the NG fragments 2B so as to separate the NG fragments 2B from OK fragments. Thus, NG fragments 2B can be effectively detected and sorted in a simplified manner.

As described above based on the specific embodiments, the film-removal/sorting method for coated resin products, of the present invention comprises a film removal step of feeding a target material which comprises a mixture of plural types of coated resin products each having a different softening temperature in at least either one of a film and a substrate thereof, into a film removing apparatus, and heating the target material in the film removing apparatus up to a temperature allowing the substrate or the film of at least either one of the coated resin products to be softened in a non-molten state, so as to remove the film from the substrate, and a sorting step of sorting the target material after being subjected to the film removal step, between a film-free material consisting of the substrate of the coated resin product which has succeeded in removing the film therefrom, and an untreated target material consisting of the remaining coated resin products having residual films. In this method, the film removal step and the sorting step are repeatedly carried out while increasing the temperature of the target material in the film removal step stepwise within a temperature range equal to or less than a highest one of softening temperatures of the films and the substrates of the coated resin products, in such a manner that the target material is heated in the film removal step up to a first softening temperature which is a lowest one of softening temperatures of the films and the substrates of the coated resin products, and then sorted in the sorting step between a film-free material and an untreated target material having residual films, and the untreated target material is heated in the film removal step up to a softening temperature which is a lowest one of softening temperatures of the films and the substrates of the remaining coated resin products and greater than the first softening temperature, and then sorted in the sorting step between a film-free material and an untreated target material having residual films.

The film-removal/sorting system for coated resin products, of the present invention comprises a film removing apparatus adapted to heat a target material which comprises a mixture of plural types of coated resin products each having a different softening temperature in at least either one of a film and a substrate thereof, up to a temperature allowing the substrate or the film of at least either one of the coated resin products to be softened in a non-molten state so as to perform a film removal treatment of removing the film from the substrate, a sorting apparatus adapted to sort the target material after being subjected to the film removal treatment, between a film-free material consisting of the substrate of the coated resin product which has succeeded in removing the film therefrom, and an untreated target material consisting of the remaining coated resin products having residual films, so as to perform a sorting operation, and control means adapted to control respective operations of the film removing apparatus and the sorting apparatus. The control means is configured to controllably operate the film removing apparatus and the sorting apparatus to repeatedly perform the film removal treatment and the sorting operation while allowing the film removing apparatus to increase the temperature of the target material stepwise within a temperature range equal to or less than a highest one of softening temperatures of the films and the substrates of the coated resin products, in such a manner that the target material is heated up to a first softening temperature which is a lowest one of softening temperatures of the films and the substrates of the coated resin products, through the film removal treatment, and then sorted between a film-free material and an untreated target material having residual films, through the sorting operation, and the untreated target material is heated up to a softening temperature which is a lowest one of softening temperatures of the films and the substrates of the remaining coated resin products and greater than the first softening temperature, through the film removal treatment, and then sorted between a film-free material and an untreated target material having residual films, through the sorting operation.

In the above method and system of the present invention, plural types of coated resin products are softened in a non-molten state in such a manner as to be heated stepwise up to a temperature selected from softening temperatures of substrates and films thereof in ascending order, to perform plural cycle of the film removal treatments at the respective softening temperatures, while performing the sorting operation depending on the presence of a residual film, every time each of the film removal treatments is completed. Thus, even when the film removal treatment and the sorting operation are performed for a mixture of plural types of coated resin products, the film removal rate (accuracy) in the film removal treatment can be improved in a simplified manner to achieve a higher recycling rate and contribute to quality improvement in recycled products.

In the film-removal/sorting method of the present invention, for example, when each of the plural types of coated resin products has a different softening temperature zone in at least either one of the film and the substrate thereof, or when the film and the substrate are different in material from each other, or when one of the film and the substrate is made of a thermosetting resin material, and the other is made of a thermoplastic resin material, a temperature of the target material during the film removal treatment can be readily set, depending on characteristics of films and substrates of the target material during the film removal treatment, to effectively enhance the film removal rate (accuracy) irrespective of types of the films and/or the substrates.

Preferably, the film-removal/sorting method of the present invention includes a shredding step of shredding the coated resin products before the film removal step, wherein the coated resin products after being subjected to the shredding step are fed into the film removing apparatus as the target material.

Preferably, the film-removal/sorting system of the present invention includes a shredding apparatus adapted to shred the coated resin products before the film removal treatment by the film removing apparatus, so as to perform a shredding operation, wherein the film-removal/sorting system is designed such that the coated resin products after being subjected to the shredding operation are fed into the film removing apparatus as the target material.

The above method or system makes it possible to perform the film removal treatment and the sorting operation using a smaller-size apparatus without any difficulty.

In the film-removal/sorting method of the present invention, the film removal step preferably includes agitating the target material after being subjected to the shredding step, in the film removing apparatus.

In the film-removal/sorting system of the present invention, the film removing apparatus is preferably adapted to agitate therein the target material after being subjected to the shredding operation.

The above method or system makes it possible to obtain an enhanced film removal rate in a simplified manner.

In the film-removal/sorting method of the present invention, the sorting step preferably includes detecting a residual film on the substrate or a specific material contained in the film, using a sensor.

In the film-removal/sorting system of the present invention, the sorting apparatus preferably includes a sensor for detecting a residual film left on the substrate or a specific material contained in the film.

The above method or system makes it possible to discriminate the untreated target material having residual films from the film-free material.

In the film-removal/sorting method of the present invention, the sorting step preferably includes detecting a difference in luminance, chromaticness or hue between a background color and a color of an optical image of the target material detected by an optical sensor.

In the film-removal/sorting system of the present invention, the sensor is preferably an optical sensor adapted to detect a difference between a background color and a luminance, chromaticness or hue of an optical image of the target material.

The above method or system makes it possible to reduce error detection of the untreated target material having residual films so as to effectively obtain enhanced film-detection accuracy in a simplified manner.

In the film-removal/sorting method of the present invention, the sorting step preferably includes detecting the untreated target material having residual films, using the sensor, while moving the entire target material after being subjected to the film removal step, in one direction, and blowing air against only the untreated target material to change a moving direction of the untreated target material so as to separate the untreated target material from the film-free material.

In the film-removal/sorting system of the present invention, the sorting apparatus is preferably adapted to detect the untreated target material having residual films, using the sensor, while moving the entire target material after being subjected to the film removal treatment, in one direction, and blow air against only the untreated target material to change a moving direction of the untreated target material so as to separate the untreated target material from the film-free material.

The above method or system makes it possible to effectively detect and sort the untreated target material having residual films, in a simplified manner.

In the film-removal/sorting method of the present invention, each of the coated resin products is preferably a molded resin component of a used automobile.

The above method makes it possible to improve the film removal rate (accuracy) in the film removal treatment for molded resin components of used automobiles so as to achieve a higher recycling rate and contribute to quality improvement in recycled products.

This application is based on Japanese Patent Application Serials Nos. 2006-034283 and 2006-320743, filed with Japan Patent Office on Feb. 10, 2006 and Nov. 28, 2006, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for film removal and sorting of coated resin products, said method comprising the steps of:
   a film removal step of feeding a target material which comprises a mixture of plural types of coated resin products each having a different softening temperature in at least either one of a film and a substrate thereof, into a film removing apparatus, and heating said target material in said film removing apparatus up to a temperature allowing the substrate or the film of at least either one of said coated resin products to be softened in a non-molten state, so as to remove said film from said substrate; and
   a sorting step of sorting said target material after being subjected to said film removal step, between a film-free material consisting of the substrate of said coated resin product which has succeeded in removing the film therefrom, and an untreated target material consisting of the remaining coated resin products having residual films,
   characterized in that:
   said film removal step and said sorting step are repeatedly carried out while increasing the temperature of the target material in said film removal step stepwise within a temperature range equal to or less than a highest one of softening temperatures of the films and the substrates of said coated resin products, in such a manner that:
   said target material is heated in said film removal step up to a first softening temperature which is a lowest one of softening temperatures of the films and the substrates of said coated resin products, and then sorted in said sorting step between a film-free material and an untreated target material having residual films; and
   said untreated target material is heated in said film removal step up to a softening temperature which is a lowest one of softening temperatures of the films and the substrates of the remaining coated resin products and greater than said first softening temperature, and then sorted in said sorting step between a film-free material and an untreated target material having residual films.

2. The method according to claim 1, wherein each of said plural types of coated resin products has a different softening temperature zone in at least either one of the film and the substrate thereof.

3. The method according to claim 2, wherein said film and said substrate are different in material from each other.

4. The method according to claim 3, wherein one of said film and said substrate is made of a thermosetting resin material, and the other is made of a thermoplastic resin material.

5. The method according to claim 1, which includes a shredding step of shredding said coated resin products before said film removal step, wherein the coated resin products after being subjected to said shredding step are fed into said film removing apparatus as said target material.

6. The method according to claim 5, wherein said film removal step includes agitating the target material after being subjected to said shredding step, in said film removing apparatus.

7. The method according to claim 1, wherein said sorting step includes detecting a residual film on the substrate or a specific material contained in the film, using a sensor.

8. The method according to claim 7, wherein said sorting step includes detecting a difference in luminance, chromaticness or hue between a background color and a color of an optical image of the target material detected by an optical sensor.

9. The method according to claim 7, wherein said sorting step includes detecting the untreated target material having residual films, using said sensor, while moving the entire target material after being subjected to said film removal step, in one direction, and blowing air against only said untreated target material to change a moving direction of said untreated target material so as to separate said untreated target material from said film-free material.

10. The method according to claim 1, wherein each of said coated resin products is a molded resin component of a used automobile.

11. A system for film removal and sorting of coated resin products, comprising:
a film removing apparatus adapted to heat a target material which comprises a mixture of plural types of coated resin products each having a different softening temperature in at least either one of a film and a substrate thereof, up to a temperature allowing the substrate or the film of at least either one of said coated resin products to be softened in a non-molten state so as to perform a film removal treatment of removing said film from said substrate;
a sorting apparatus adapted to sort said target material after being subjected to said film removal treatment, between a film-free material consisting of the substrate of said coated resin product which has succeeded in removing the film therefrom, and an untreated target material consisting of the remaining coated resin products having residual films, so as to perform a sorting operation; and
control means adapted to control respective operations of said film removing apparatus and said sorting apparatus, said control means being configured to controllably operate said film removing apparatus and said sorting apparatus to repeatedly perform said film removal treatment and said sorting operation while allowing said film removing apparatus to increase the temperature of the target material stepwise within a temperature range equal to or less than a highest one of softening temperatures of the films and the substrates of said coated resin products, in such a manner that:
said target material is heated up to a first softening temperature which is a lowest one of softening temperatures of the films and the substrates of said coated resin products, through the film removal treatment, and then sorted between a film-free material and an untreated target material having residual films, through the sorting operation; and
said untreated target material is heated up to a softening temperature which is a lowest one of softening temperatures of the films and the substrates of the remaining coated resin products and greater than said first softening temperature, through the film removal treatment, and then sorted between a film-free material and an untreated target material having residual films, through the sorting operation.

12. The system according to claim 11, which includes a shredding apparatus adapted to shred said coated resin products before said film removal treatment by said film removing apparatus, so as to perform a shredding operation, wherein said system is designed such that the coated resin products after being subjected to said shredding operation are fed into said film removing apparatus as said target material.

13. The system according to claim 12, wherein said film removing apparatus is adapted to agitate therein the target material after being subjected to said shredding operation.

14. The system according to claim 11, wherein said sorting apparatus includes a sensor for detecting a residual film on the substrate or a specific material contained in the film.

15. The system according to claim 14, wherein said sensor is an optical sensor adapted to detect a difference between a background color and a luminance, chromaticness or hue of an optical image of the target material.

16. The system according to claim 14, wherein said sorting apparatus is adapted to detect the untreated target material having residual films, using said sensor, while moving the entire target material after being subjected to said film removal treatment, in one direction, and blow air against only said untreated target material to change a moving direction of said untreated target material so as to separate said untreated target material from said film-free material.

* * * * *